US012527303B2

(12) United States Patent
Zhang et al.

(10) Patent No.: US 12,527,303 B2
(45) Date of Patent: Jan. 20, 2026

(54) LABORATORY ZEBRAFISH AUTISM BEHAVIORAL MODEL APPARATUS

(71) Applicants: Soochow university, Suzhou (CN); Suzhou Industrial Park Center for Disease Control and Prevention, Suzhou (CN)

(72) Inventors: Jie Zhang, Suzhou (CN); Jianjun Liu, Suzhou (CN); Ouxi Shen, Suzhou (CN); Xiaoyao Song, Suzhou (CN)

(73) Assignees: Soochow university, Suzhou (CN); Suzhou Industrial Park Center for Disease Control and Prevention, Suzhou (CN)

( * ) Notice: Subject to any disclaimer, the term of this patent is extended or adjusted under 35 U.S.C. 154(b) by 363 days.

(21) Appl. No.: 18/370,447

(22) Filed: Sep. 20, 2023

(65) Prior Publication Data

US 2024/0099276 A1    Mar. 28, 2024

(30) Foreign Application Priority Data

Sep. 23, 2022   (CN) .......................... 202211162942.0

(51) Int. Cl.
   *A01K 63/00* (2017.01)
(52) U.S. Cl.
   CPC ............ *A01K 63/00* (2013.01); *A01K 63/003* (2013.01)
(58) Field of Classification Search
   CPC ............................. A01K 63/00; A01K 63/003
   (Continued)

(56) References Cited

U.S. PATENT DOCUMENTS

| 5,222,458 A * | 6/1993 | Pippy ..................... A01K 61/90 434/297 |
| 2013/0206077 A1* | 8/2013 | Castranova ............. A01K 1/03 119/248 |

FOREIGN PATENT DOCUMENTS

| CN | 104221970 A | 12/2014 |
| CN | 112862853 A | 5/2021 |

(Continued)

OTHER PUBLICATIONS

Adam Michael Stewart, et al., Developing zebrafish models of autism spectrum disorder (ASD), Progress in Neuro-Psychopharmacology & Biological Psychiatry, 2014, pp. 27-36, vol. 50.

*Primary Examiner* — Thomas J Hong
(74) *Attorney, Agent, or Firm* — Bayramoglu Law Offices LLC

(57) ABSTRACT

A laboratory zebrafish autism behavioral model apparatus is provided. The laboratory zebrafish autism behavioral model apparatus comprises a model body, wherein the model body is divided into a plurality of experimental units, and each of the experimental units has a cuboid structure with completely identical shapes; a free swimming area, a stimulus area, and a normal non-stimulus area are formed on each of the experimental units; the stimulus area and the normal non-stimulus area are located on two sides of the free swimming area, respectively, and the free swimming area, the stimulus area, and the normal non-stimulus area are interconnected via mesh openings. The zebrafish autism behavioral model apparatus facilitates further exploration of autism etiology, effectively resolving interference between the stimulus area and the zebrafish's innate thigmotactic behavior, reducing experimental errors, saving time, and minimizing instrument wear and costs.

3 Claims, 2 Drawing Sheets

(58) Field of Classification Search
USPC .......................................................... 434/297
See application file for complete search history.

(56) References Cited

FOREIGN PATENT DOCUMENTS

| | | |
|---|---|---|
| CN | 112870384 A | 6/2021 |
| CN | 113005142 A | 6/2021 |
| CN | 214593483 U | 11/2021 |
| CN | 113940306 A | 1/2022 |
| KR | 20100087684 A | 8/2010 |

\* cited by examiner

LABORATORY ZEBRAFISH AUTISM BEHAVIORAL MODEL APPARATUS

CROSS REFERENCE TO THE RELATED APPLICATIONS

This application is based upon and claims priority to Chinese Patent Application No. 202211162942.0, filed on Sep. 23, 2022, the entire contents of which are incorporated herein by reference.

TECHNICAL FIELD

The present invention relates to the technical field of zebrafish autism behavioral studies, and in particular to a laboratory zebrafish autism behavioral model apparatus.

BACKGROUND

Currently, there are limited studies on the etiology of autism using model animals, and even fewer studies utilizing zebrafish for etiological exploration. Existing zebrafish autism behavioral models have many limitations, making them insufficient for a variety of behavioral studies.

Currently, zebrafish autism behavioral models are typically concentric circle models. However, zebrafish exhibit thigmotactic behavior, and the main limitation of concentric circle models is the inability to determine whether the zebrafish's swimming range is due to external stimuli or their innate thigmotaxis. Secondly, existing concentric circle models can only accommodate a limited number of zebrafish, which cannot meet the requirements of single-factor, multi-group experiments. Repeated trials cannot ensure consistent experimental conditions and would result in significant intra-group errors, making it difficult to obtain accurate experimental results.

SUMMARY

The main objective of the present invention is to provide a laboratory zebrafish autism behavioral model apparatus to address the issues present in the prior art.

To solve the aforementioned technical problems, the present invention adopts the following technical solution:

Provided is a laboratory zebrafish autism behavioral model apparatus, comprising a model body, wherein the model body is divided into a plurality of experimental units, and each of the experimental units has a cuboid structure with completely identical shapes; a free swimming area, a stimulus area, and a normal non-stimulus area are formed on each of the experimental units; the stimulus area and the normal non-stimulus area are located on two sides of the free swimming area, respectively, and the free swimming area, the stimulus area, and the normal non-stimulus area are interconnected via mesh openings.

Furthermore, a central portion of the experimental unit is recessed downwards from a top surface to form a groove; within the groove, two transverse partitions are provided; the two transverse partitions divide the groove into a first area, a second area, and a third area; the first area, the second area, and the third area correspond to the free swimming area, the stimulus area, and the normal non-stimulus area, respectively.

Furthermore, a vertical partition is provided between the two transverse partitions; the vertical partition divides the first area into two free swimming areas.

Furthermore, the two free swimming areas have identical dimensions of 20 mm in length, 9.5 mm in width, and 7 mm in height.

Furthermore, there are a plurality of the mesh openings, each with a diameter of 0.3 mm, evenly distributed on the two transverse partitions.

Furthermore, the model body is 124 mm in length, 84 mm in width, and 9 mm in height and is divided into eight experimental units.

Furthermore, the stimulus area and the normal non-stimulus area have identical dimensions of 20 mm in length, 4 mm in width, and 7 mm in height.

Furthermore, the free swimming area and the normal non-stimulus area are both filled with water.

Furthermore, the stimulus area is filled with stimuli to provide stimulation to a zebrafish.

Compared with the prior art, the present invention has the following beneficial effects:
  1. By improving the concentric circle model into a cuboid model, interference between the stimulus area and the zebrafish's innate thigmotactic behavior is effectively resolved.
  2. The arrangement of a plurality of experimental units on the model body effectively increases the number of zebrafish per batch of experiment, reducing instrument wear and saving time and costs, and significantly improving experimental efficiency.
  3. The plurality of experimental units have completely identical shapes, and by increasing their number, intergroup differences can be minimized, thus improving the accuracy of experimental results.
  4. A more mature solution for autism etiological studies is provided, facilitating scientific investigations.

DETAILED DESCRIPTION OF THE EMBODIMENTS

The technical solution of the present invention is further explained below by accompanying drawings and the embodiments.

Figure 1:
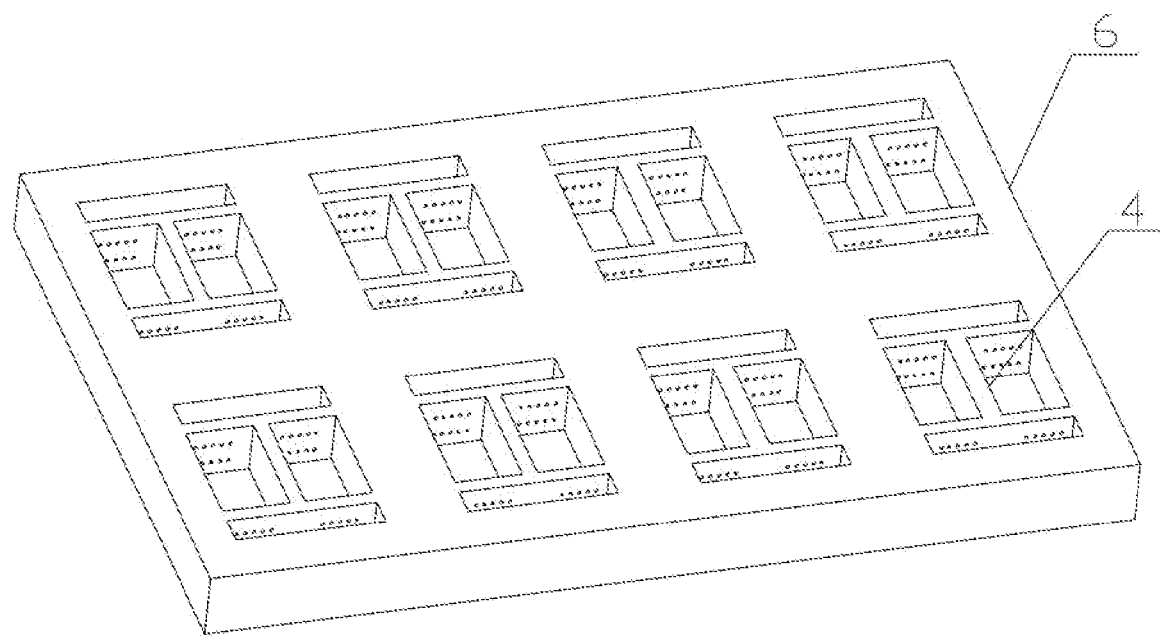
FIG. 1 is a schematic diagram of the overall structure of the present invention.
Figure 2:
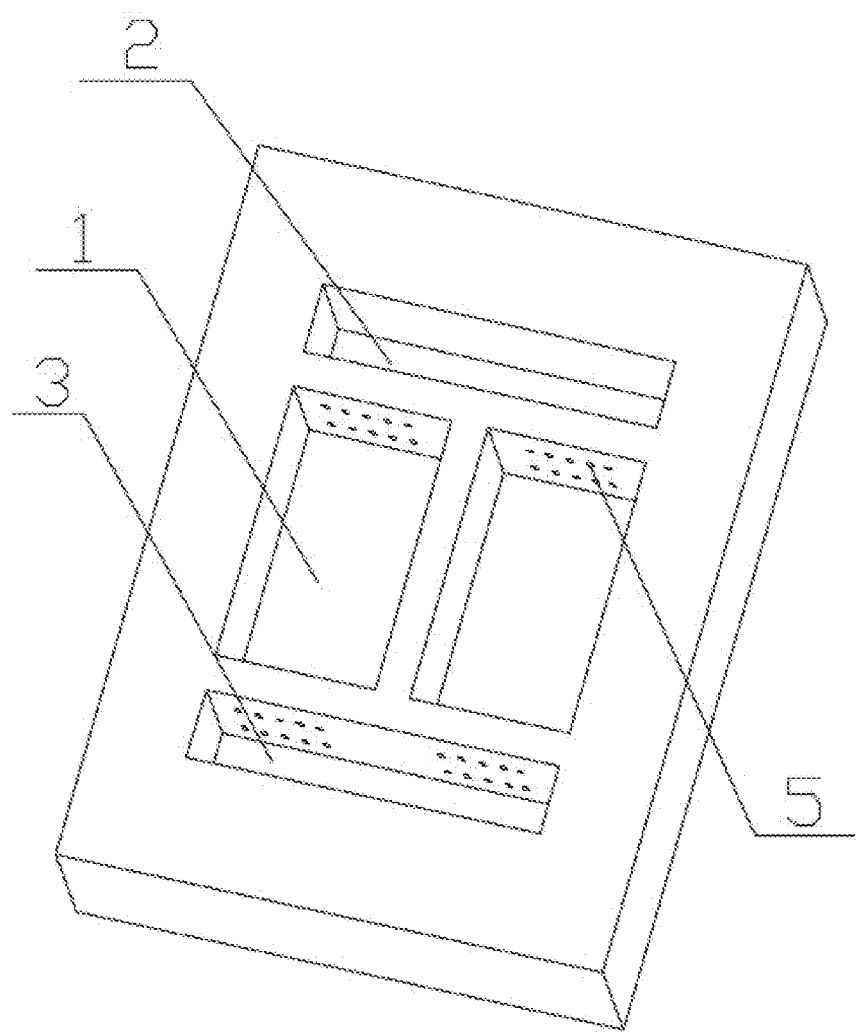
FIG. 2 is a schematic diagram of the experimental unit structure of the present invention.
  1—Free swimming area, 2—Stimulus area, 3—Normal non-stimulus area, 4—Experimental unit, 5—Mesh opening, 6—Model body.

Referring to FIGS. 1 to 2, the present invention provides a laboratory zebrafish autism behavioral model apparatus, which comprises a model body 6. The model body 6 is divided into a plurality of experimental units 4, and each of the experimental units 4 has a cuboid structure with completely identical shapes. A free swimming area 1, a stimulus area 2, and a normal non-stimulus area 3 are formed on each of the experimental units 4. The stimulus area 2 and the normal non-stimulus area 3 are located on the two sides of the free swimming area 1, respectively, and the free swimming area 1, the stimulus area 2, and the normal non-stimulus area 3 are interconnected via mesh openings 5. By improving the concentric circle model into a cuboid model, interference between the stimulus area 2 and the zebrafish's innate thigmotactic behavior is effectively resolved.

Preferably, the central portion of the experimental unit 4 is recessed downwards from the top surface to form a groove. Within the groove, two transverse partitions are provided. The two transverse partitions divide the groove into a first area, a second area, and a third area. The first area, the second area, and the third area correspond to the free swimming area 1, the stimulus area 2, and the normal non-stimulus area 3, respectively. A vertical partition is provided between the two transverse partitions. The vertical partition divides the first area into two free swimming areas 1.

In this embodiment, the two free swimming areas 1 have identical dimensions. By increasing their number, inter-group differences can be minimized, thus improving the accuracy of experimental results. Each free swimming area has dimensions of 20 mm in length, 9.5 mm in width, and 7 mm in height, and is filled with water during the experiment to allow zebrafish fry to swim freely.

Preferably, there are a plurality of mesh openings 5, each with a diameter of 0.3 mm, evenly distributed on the two transverse partitions. The mesh openings 5 are used to facilitate communication between the free swimming area 1, the stimulus area 2, and the normal non-stimulus area 3, conveying both stimulus and non-stimulus information.

Preferably, the model body 6 is 124 mm in length, 84 mm in width, and 9 mm in height and is divided into eight experimental units 4. In other words, the model body 6 consists of eight areas with completely identical shapes and is made of non-toxic, harmless, and high-strength resin. The model body is to be used in conjunction with zebrafish behavioral instruments, allowing for the observation and analysis of zebrafish free swimming patterns to determine the presence of autistic behavior. This provides a more mature solution for autism etiological studies, facilitating scientific investigations.

The simultaneous use of the eight experimental units 4 effectively increases the number of zebrafish per batch of experiment, reducing instrument wear and saving time and costs, and significantly improving experimental efficiency.

In this embodiment, the stimulus area 2 and the normal non-stimulus area 3 have identical dimensions of 20 mm in length, 4 mm in width, and 7 mm in height. During the experiment, the stimuli for the respective experimental projects are placed in the stimulus area to provide stimulation. The normal non-stimulus area 3 is filled with water during the experiment, serving as a non-stimulatory buffer zone.

The above description is only preferred embodiments of the present invention, and is not intended to limit the technical scope of the present invention. As such, any minor amendments, equivalent changes, and modifications made to the above embodiments according to the technical spirit of the present invention shall fall within the scope of the technical solution of the present invention.

What is claimed is:

1. A laboratory zebrafish autism behavioral model apparatus, comprising a model body, wherein the model body is divided into a plurality of experimental units, and each of the plurality of experimental units has a cuboid structure with completely identical shapes; a free swimming area, a stimulus area, and a normal non-stimulus area are formed on each of the plurality of experimental units; the stimulus area and the normal non-stimulus area are located on two sides of the free swimming area, respectively, and the free swimming area, the stimulus area, and the normal non-stimulus area are interconnected via mesh openings;
   a central portion of the experimental unit is recessed downwards from a top surface to form a groove; within the groove, two transverse partitions are provided; the two transverse partitions divide the groove into a first area, a second area, and a third area; the first area, the second area, and the third area correspond to the free swimming area, the stimulus area, and the normal non-stimulus area, respectively;
   a vertical partition is provided between the two transverse partitions; the vertical partition divides the first area into two free swimming areas;
   the two free swimming areas have identical dimensions of 20 mm in length, 9.5 mm in width, and 7 mm in height;
   the stimulus area and the normal non-stimulus area have identical dimensions of 20 mm in length, 4 mm in width, and 7 mm in height;
   the free swimming area and the normal non-stimulus area are both filled with water;
   the stimulus area is filled with stimuli to provide stimulation to a zebrafish.

2. The laboratory zebrafish autism behavioral model apparatus according to claim 1, wherein there are a plurality of the mesh openings, each with a diameter of 0.3 mm, evenly distributed on the two transverse partitions.

3. The laboratory zebrafish autism behavioral model apparatus according to claim 1, wherein the model body is 124 mm in length, 84 mm in width, and 9 mm in height and is divided into eight experimental units.

* * * * *